Feb. 8, 1955     H. M. RADIN ET AL     2,701,658
DUMP TANK ATTACHMENT FOR INDUSTRIAL TRUCKS
Filed Aug. 3, 1951     2 Sheets-Sheet 1
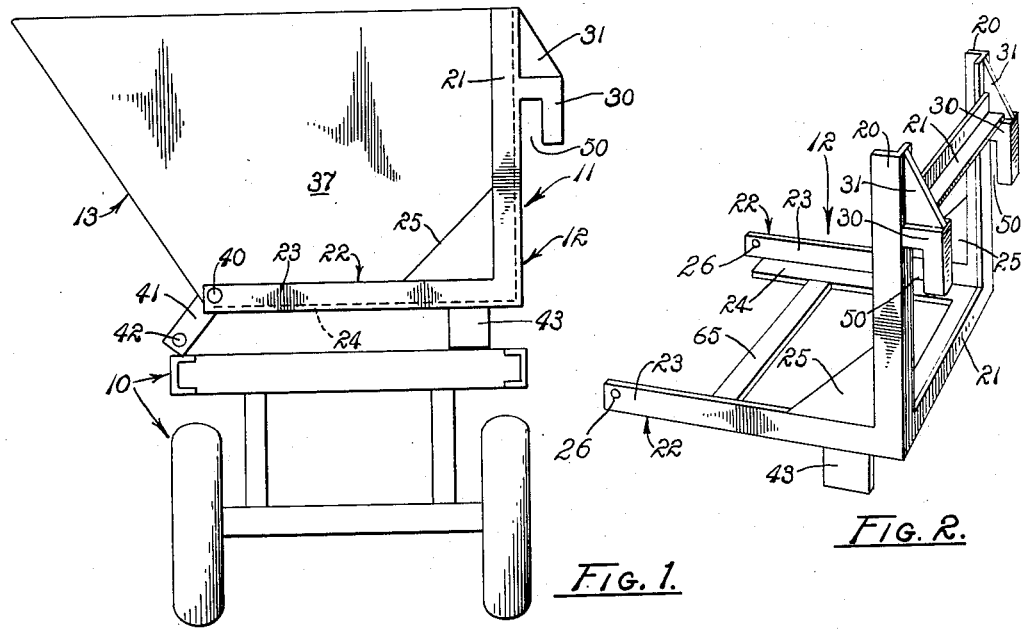
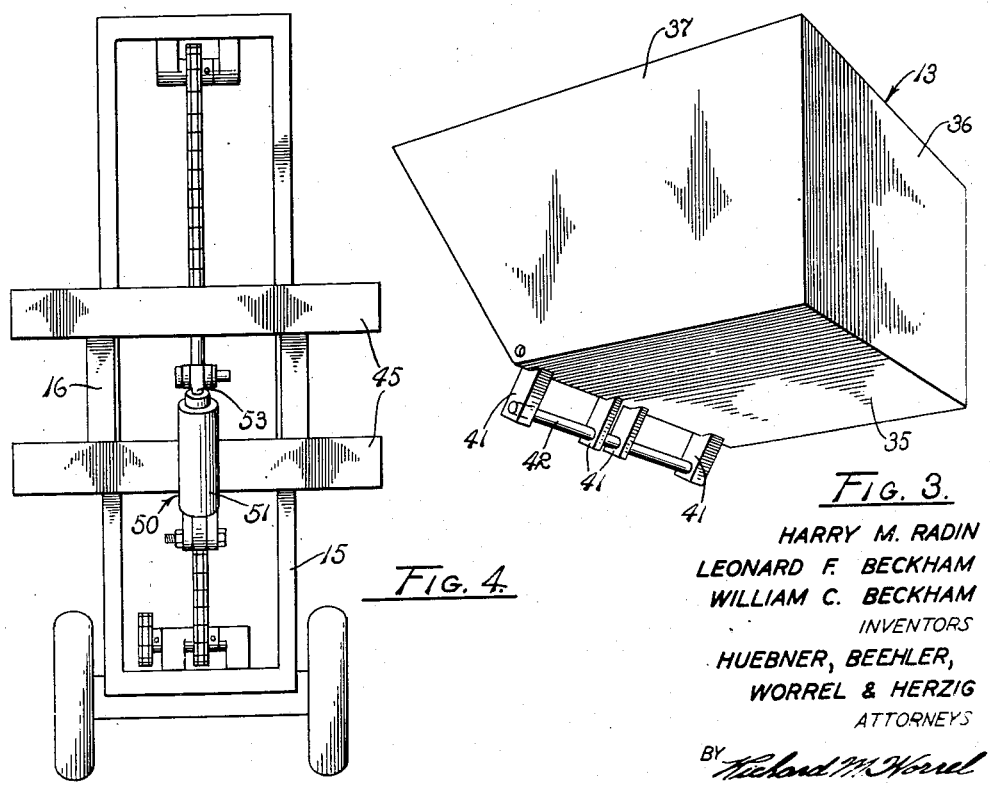
HARRY M. RADIN
LEONARD F. BECKHAM
WILLIAM C. BECKHAM
INVENTORS
HUEBNER, BEEHLER,
WORREL & HERZIG
ATTORNEYS Feb. 8, 1955
H. M. RADIN ET AL
2,701,658
DUMP TANK ATTACHMENT FOR INDUSTRIAL TRUCKS
Filed Aug. 3, 1951
2 Sheets-Sheet 2
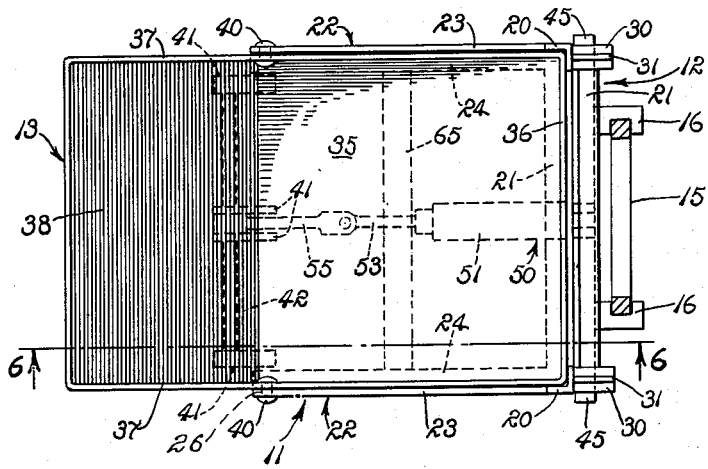
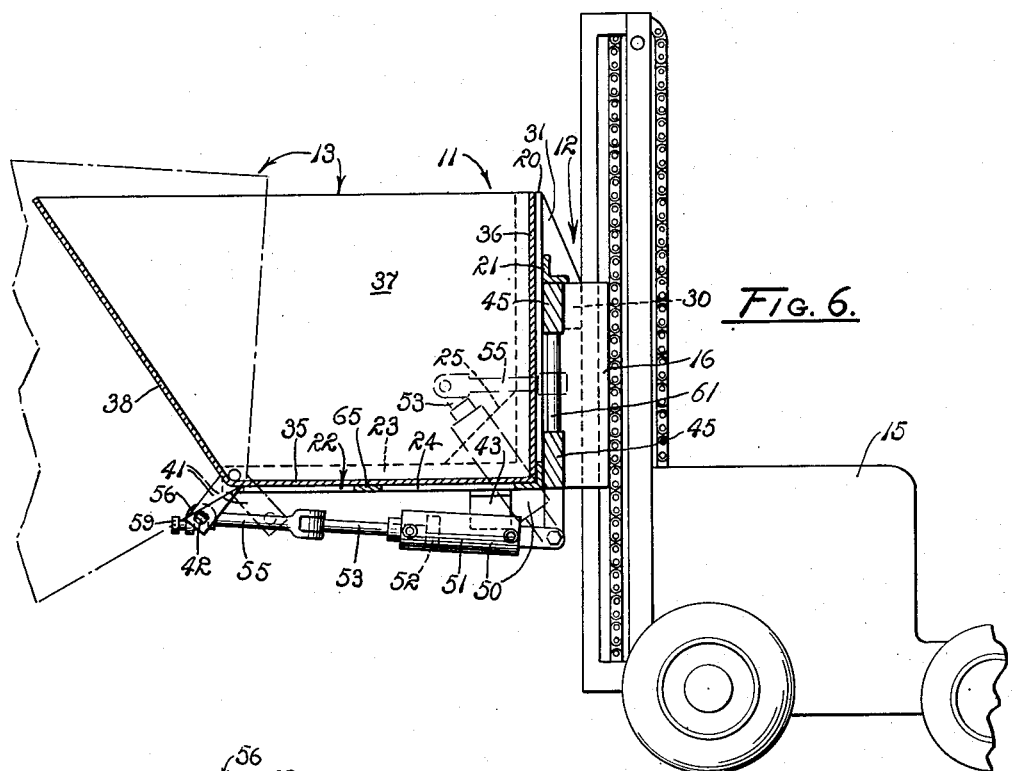
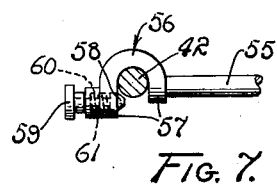
HARRY M. RADIN
LEONARD F. BECKHAM
WILLIAM C. BECKHAM
INVENTORS
HUEBNER, BEEHLER, WORREL & HERZIG
ATTORNEYS
BY *Richard M. Worrel* ically interconnected between an industrial truck and support tank of the character described.

Another object is to provide a control linkage of the character alluded to above which is foldable for compact support on the industrial truck when not in use and extendable for use in a manner permitting its subjection to tension and compression without collapse.

Further objects and advantages are to provide improved elements and arrangements thereof in a device of the character set forth that is fully effective in its operation, economical to produce, and of durable simplicity.

Still further objects and advantages will become apparent in the subsequent description in the specification.

Referring to the drawings:

Fig. 1 is a side elevation of a dump tank attachment for industrial trucks embodying the principles of the present invention shown rested on a wagon of a type well-known for vineyard use.

Fig. 2 is a perspective view of a carriage portion of the present invention.

Fig. 3 is a perspective view of a tank utilized in the carriage shown in Fig. 2.

Fig. 4 is the front view of an industrial truck providing the desired mobility and elevational positioning of the carriage and tank.

Fig. 5 is a plan view of the dump tank attachment.

Fig. 6 is a longitudinal vertical section of the dump tank attachment taken on line 6—6 of Fig. 5 in association with an industrial truck illustrated in fragmentary side elevation.

Fig. 7 is an enlarged side elevation of a coupling utilized in the provision of releasably controlled connection to the dump tank attachment.

Referring in greater detail to the drawings:

A vineyard wagon is illustrated generally at 10 providing the mobile support for a plurality of dump tank attachments 11 of the present invention through a vineyard or the like, as previously described. Although such wagons are commonly known as vineyard trucks such designation is avoided herein to obviate confusion with the industrial trucks and automotive trucks alluded to. The attachment consists of a carriage 12 pivotally mounting a tank 13 to which a control linkage presently more fully described is releasably connected.

An industrial truck 15 having an elevationally controlled elevator 16 is fragmentarily illustrated in Figs. 4 and 6 exemplifying vehicles generally providing elevational control and mobility suitable to the utilization of the device of the present invention.

The carriage 12 is best seen in Fig. 2 and includes a pair of substantially parallel erect posts 20 of angle iron or other suitable rigid material. The posts are interconnected in fixed spaced relation by horizontal struts 21 weldably or otherwise secured therebetween. A pair of angle iron arms 22 are welded to the lower ends of the posts 20 and horizontally extended therefrom in parallel relation. The angle iron arms 22 are so positioned as to provide parallel marginal side walls 23 and inwardly directed flanges 24 defining a tank receiving channel between the walls. It will be observed that the posts 20 and their respective arms 22 are in substantially right angular relation and their angular interconnection is preferably reinforced by gusset plates 25. The arms 22 are provided with aligned openings 26 in their extended ends.

Inverted L-shaped hooks 30 are welded or otherwise secured adjacent to the upper ends of the posts 20 and are reinforced by gusset plates 31 interconnecting the hooks and their respective posts.

The tank 13, best shown in Fig. 3, is fabricated from sheet steel, galvanized iron, stainless steel, or other suitable material and provides a substantially flat bottom 35, an erect rear wall 36, opposite side walls 37, and a forwardly and upwardly extended front wall 38. Although tanks of other shape may be utilized, the form shown is excellently suited to the purpose. Inasmuch as a considerable amount of juice is crushed from grapes deposited in the tanks, the tanks are water tight so that all such juice may be conveyed to the loading point. The bottom 35 of the tank is fitted to the tank receiving channel defined by the arms 22.

A pair of axially aligned trunnions or pivot pins 40 conveniently shown as double headed bolts are mounted in the side walls 37 of the tank adjacent to the intersection of the front wall 38 and the bottom 35 and oppositely extended from the tank and journaled in the corresponding opening 26 in the extended ends of the arms 22. A plurality of levers 41 are rigidly mounted on the tank and extended downwardly and forwardly from the tank in a common plane radial to the trunnions. A shaft 42 is mounted in the extended ends of the levers 41 in parallel relation to the trunnions.

As evident in Fig. 1, when the tank 13 is rested on the arms 22, the downwardly and forwardly extended levers 41 provide an elevated support for the tank and the forward end portions of the arms 22. A foot 43 of sheet steel or the like is rigidly mounted on the rearward end portion of each arm 22 and downwardly extended therefrom a distance substantially equal to the downward component of the extension of the levers 41.

A pair of substantially horizontal, vertically spaced plates 45 are mounted on the elevator 16 for engagement by the rear wall 36 of the tank. Although a pair of such plates are found excellently suited to the purpose it will be obvious to anyone skilled in the art that one or any other desired number of plates or equivalent structures may be employed. The hooks 30 are of such form as to provide downwardly disposed plate receiving channels 46 adapted to fit over the upper edge of the uppermost plate 45.

A two-way ram 50 is mounted for vertical pivotal movement on the elevator 16. The ram characterizes controlled extensible and contractible means for effecting controlled tipping of the tank 13 to and from emptying position and includes a cylinder 51 slidably receiving a piston 52 endwardly from which is extended a piston rod 53. As is well known in hydraulic control rams and the like, the piston rod 53 is rotatable relative to the cylinder 51. The ram is adjustably contracted and extended by means of a conventional hydraulic control system, not shown, of the industrial truck 15. A piston rod extension 55 is pivotally connected to the extended end of the piston rod 53 for pivotal movement about an axis transversely of each rod. The extension 55 has a generally U-shaped coupling 56 mounted on the end thereof releasably engageable with the shaft 42. The coupling provides a pair of spaced legs 56 in a plane common to the extension and the pivotal axis of the extension on the piston rod. A detent 58 is slidably extended through one of the legs 56 and provides an operating head 59 disposed for convenient grasp. A spring 60 is mounted under initial compression within the coupling 56 against the detent and serves to urge the detent toward the opposite leg 57 releasably blocking disengagement of the shaft 42 from the coupling when interconnected.

Operation

The operation of the device of the present invention is believed to be clearly apparent and is briefly summarized at this point. A plurality of the dump tank attachments 11 are rested on a vineyard truck or other conveyance and drawn through the vineyard to receive picked grapes. It is worthy of note that the tanks 13 are so pivotally mounted in their carriages 12 that the contents thereof tend to maintain the tanks in rested position on the arms 22. It will also be apparent, that the resting of the tanks on the arms limits the counterclockwise pivotal movement of the levers 41, as viewed in Fig. 1, so that the levers constitute elevational supports for the forward end of the carriages and the tanks. Obviously the weight of the carriage imposed on the trunnions 40 while rested on the levers 41 further serves dependably to maintain the tanks in seated position on the arms against jostling displacement incident to the traversal of rough terrain normally encountered in vineyards and the like.

The feet 43 with the levers 41 serve to maintain the tanks 13 and arms 22 in substantially parallel spaced relation to the supporting surface on which they are rested, such as the vineyard wagon 10. The industrial truck 15 readily lifts the dump tank attachment 11 from the wagon or other support by approaching the same with the elevator 16 in a lowered position until a plate 45 engages the rear wall 36 of the tank. By raising the elevator 16, the uppermost plate 45 slides into the channels 46 of the hooks 30 and, with the rear wall 36 of the tank rested against the plates, the tank and its contents are conveniently elevated and transported to a dumping position.

The ram 50 is quickly connected to the levers 41 by pivotal engagement with the shaft 42. This is easily effected by pivoting the ram into a position extended toward the shaft, rotating the piston rod 53 so that the pivotal axis of the piston rod and its extension 55 is substantially vertical, and thrusting the coupling 56 down over the shaft 42. Simple downward movement causes the detent to retract as it passes the shaft subsequent to which the spring 60 urges it into locking position, shown in Fig. 7.

It is significant that during operation, the pivotal axis of the extension 55 and the piston rod 53 is in right angular relation to the pivotal axis of the ram 50 on the elevator. Contraction of the ram pivots the tank 13 on the trunnions 40 into the position shown in dashed line in Fig. 6 causing the tank to disgorge its contents. To return the tank to horizontal position, the ram 50 is extended. The right angular relation of the pivotal axis of the extension and of the ram on the elevator precludes buckling of the control linkage between the elevator and the shaft and yet permits convenient connection and disconnection as well as compact support on the elevator in folded condition.

The coupling 56 is readily removed from the shaft 42 disconnecting the ram from the dump tank attachment by pulling outwardly on the head 59, retracting the detent 58 into its respective leg 57, and lifting the coupling from the shaft. As shown in Fig. 4, during operation of the industrial truck without the dump tank attachment, the ram is conveniently upwardly pivoted and the piston rod rotated to a position most convenient for the upward direction of the extension 55 and the hooked engagement of the coupling 56 with a pin 61 mounted on the elevator or other convenient extension supporting means.

When the tank 13 has been emptied and the ram disconnected from the shaft 42, the dump tank attachment 11 is conveniently returned to the vineyard truck 10 or other supporting surface and removed from the industrial truck by the simple lowering of the elevator 16 to draw the uppermost plate 45 from the hooks 30. It will be apparent that the elevated support of the carriage 12 and tank 13 on a supporting surface also permits the use of a fork truck to lift the carriage. Fork truck operation is essentially the same as that described for the industrial truck 15 except that the forks are simply extended under the carriage. To adapt the carriage for fork truck support, the arms 22 are preferably interconnected by a transverse strut 65.

The dump tank attachment of the present invention is speedily and easily connected to, and disconnected from, industrial trucks and comparable vehicles providing earth traversing movement and elevational support. The controlled connection of the ram to the pivotally mounted tank is conveniently and easily effected. The conveyance of loads contained in the attachment of the present invention, are greatly facilitated by the speed of operable association with industrial trucks and the like and ready tipping of the tanks 13 for dumping purposes. The attachments are economical to construct, durable in operation and fully effective in accomplishing their intended functions.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. In combination with an industrial truck having a vertically movable elevator, a carriage releasably mounted on the elevator, a tank pivotally mounted in the carriage, lever means rigidly connected to the tank for the controlled pivoting thereof, a ram mounted on the elevator for substantially vertical pivotal movement around a substantially horizontal axis and having a piston rod rotatably extended therefrom, a piston rod extension pivotally connected to the piston rod, a coupling member adapted for connection to the lever means in a predetermined attitude relative thereto and mounted on the extension so as to attain the connectable attitude only when the piston rod and extension are rotatably positioned for relative pivotal movement about an axis in substantially right angular relation to the horizontal axis of pivotal movement of the ram, and the coupling member being adapted for engagement with the elevator when the carriage is removed therefrom and the piston rod and extension are positioned for relative pivotal movement about an axis substantially parallel to the axis of pivotal movement of the ram.

2. A material handling device for industrial trucks having a vertically movable elevator comprising: a carriage having a pair of extended arms, and horizontally spaced mounting hooks connected to the arms and adapted for releasable engagement with the elevator to support the arms in substantially horizontal position; a tank rested on the arms; a pair of axially aligned trunnions extended from the tank and journaled in the extended end portions of the arms; a plurality of levers rigidly mounted on the tank and extended from the trunnions in a common plane radially of the trunnions; a shaft mounted in the levers in parallel relation to the trunnions; a two-way ram mounted on the carriage below the elevator for substantially vertical pivotal movement having a piston rod rotatably extended therefrom; a piston rod extension pivotally connected to the rod for movement about an axis transversely of the rod and extension; and a releasable U-shaped coupling rigidly mounted on the extension having a pair of spaced legs in a plane common to the extension in substantially parallel relation to the pivotal axis of the extension.

3. In combination with an industrial truck having a vertically movable elevator, a pair of substantially horizontal plates mounted on the elevator in elevationally spaced relation, a pair of substantially vertical post members rigidly interconnected in horizontal spaced relation, a pair of downwardly disposed horizontally spaced hooks rigidly mounted on the post members for releasable engagement with the upper plate with the post members rested against the plates, a pair of substantially parallel angle iron arms horizontally extended from the lower edges of the post members outwardly from the elevator defining a tank receiving channel therebetween, a tank rested in the receiving channel of the arms, a pair of aligned trunnions extended from the tank and journaled transversely in the extended ends of the arms on the opposite side of the center of gravity and center of capacity of the tank from the post members, a lever rigidly extended from the tank substantially radially and downwardly of the trunnions, a pair of feet downwardly extended from the arms adjacent to the post members, the feet and lever constituting rests for the arms and tank when the tank is rested in the receiving channel of the arms, and an extendible and contractible ram pivotally connected to the elevator below the arms and releasably connected to the lever.

4. In combination with an industrial truck having a vertically movable elevator; a pair of substantially horizontal plates mounted on the elevator in elevationally spaced relation; a carriage having a pair of substantially erect rigidly interconnected posts, a pair of substantially parallel angle iron arms rigidly horizontally extended from the posts defining a tank receiving channel therebetween, and a pair of spaced hooks mounted on the posts, the carriage being releasably mounted on the elevator with the posts rested against the plates by engagement of the hooks downwardly over the uppermost plate; a tank rested on the arms in the tank receiving channel thereof; a pair of aligned trunnions extended from the tank and journaled in the extended ends of the arms; a lever rigidly extended downwardly and outwardly from the tank radially of the trunnions; a pair of feet downwardly extended from the arms adjacent to the posts having lower ends terminating in downwardly spaced relation to the tank a distance substantially equal to the downwardly spaced relation of the extended end of the lever to the tank when the tank is rested on the arms; a control ram having a cylinder connected to the elevator below the carriage for pivotal movement in a substantially vertical plane, a piston slidably fitted to the cylinder, and a piston rod connected to the piston and rotatably extended from the cylinder; a piston rod extension pivotally connected to the extended end of the piston rod of the ram; and a connector mounted on the piston rod extension adapted for releasable connection to the lever when the piston rod is rotatably positioned for pivotal movement of the extension relative thereto in a plane right angularly related to the plane of pivotal movement of the cylinder.

5. A material handling and storing device, for industrial trucks having a vertically movable elevator providing a substantially vertical plate having a substantially horizontal upper edge, comprising a substantially L-shaped carriage having a substantially erect portion adapted to rest against the plate and a substantially horizontal portion rigidly extended from the lower end of the erect portion, said carriage having a pair of horizontally spaced downwardly disposed hooks mounted on the upper end of the erect portion releasably engageable over the upper edge of the plate, a material container pivotally mounted on the extended end of the horizontal portion of the carriage having a center of gravity intermediate said pivotal mounting and the erect portion of the carriage and a holding capacity also centered between said pivotal mounting and the erect portion of the carriage, a lever rigidly extended from the tank substantially radially of the pivotal mounting thereof downwardly from the tank and away from the erect portion of the carriage, a pair of feet downwardly extended from the carriage adjacent to the erect portion thereof a distance substantially equal to the downward extension of the lever, and contractable and extensible control means releasably pivotally connected between the lever and the elevator at a position below the carriage.

6. A material handling and storing device, for industrial trucks having a vertically movable elevator providing a substantially vertical plate having a substantially horizontal upper edge, comprising a substantially L-shaped carriage having a pair of substantially erect rigidly interconnected posts adapted to rest against the plate, a pair of substantially parallel rigidly interconnected arms substantially horizontally extended from the lower ends of the posts, and a pair of horizontally spaced hooks mounted on the upper end portions of the posts releasably fitted downwardly over the upper edge of the plate; a tank rested on the arms of the carriage; a pair of aligned trunnions oppositely extended from the tank at positions toward the extended ends of the arms from the center of gravity of the tank and journaled in the extended ends of the arms, the tank having a holding capacity between the trunnions and the posts substantially greater than the holding capacity of the tank opposite to the trunnions from the posts; a lever rigidly extended from the tank substantially radially of the trunnions downwardly from the tank and away from the posts; a foot downwardly extended from each arm adjacent to the posts a distance substantially equal to the downward extension of the lever whereby the arms may be supported in substantially horizontal position on the feet and lever when the carriage is detached from the plate and the feet and lever are rested on a horizontal surface; and a contractable and extensible ram releasably pivotally interconnecting the lever and the elevator at a position below the carriage.

References Cited in the file of this patent

UNITED STATES PATENTS

| | | |
|---|---|---|
| 2,304,649 | McDaniels | Dec. 8, 1942 |
| 2,319,456 | Hazen | May 18, 1943 |
| 2,386,759 | Ulm | Oct. 16, 1945 |
| 2,413,661 | Stokes | Dec. 31, 1946 |
| 2,427,301 | Puim | Sept. 9, 1947 |
| 2,437,010 | Way | Mar. 2, 1948 |
| 2,482,692 | Quales et al. | Sept. 20, 1949 |
| 2,579,409 | White | Dec. 18, 1951 |
| 2,582,759 | Sass | Jan. 15, 1952 |
| 2,585,095 | Daniels | Feb. 12, 1952 |